(No Model.)

H. W. LOSS.
STOP VALVE FOR HIGH PRESSURES.

No. 486,722. Patented Nov. 22, 1892.

Witnesses:
Hamilton D. Turner.
Alex. Barkoff

Inventor:
Henry W. Loss
by his Attorneys
Howson & Howson

THE NORRIS PETERS CO., PHOTO-LITHO., WASHINGTON, D. C.

UNITED STATES PATENT OFFICE.

HENRY W. LOSS, OF PHILADELPHIA, PENNSYLVANIA.

STOP-VALVE FOR HIGH PRESSURES.

SPECIFICATION forming part of Letters Patent No. 486,722, dated November 22, 1892.

Application filed September 30, 1890. Serial No. 366,640. (No model.)

*To all whom it may concern:*

Be it known that I, HENRY W. LOSS, a citizen of the United States, and a resident of Philadelphia, Pennsylvania, have invented certain Improvements in Stop-Valves for High Pressures, of which the following is a specification.

The object of my invention is to construct a stop-valve for use in connection with pipes or passages conveying fluids under heavy pressure—such, for instance, as are used on hydraulic forging machinery. This object I attain in the manner hereinafter set forth, reference being had to the accompanying drawings, in which—

Figure 1:
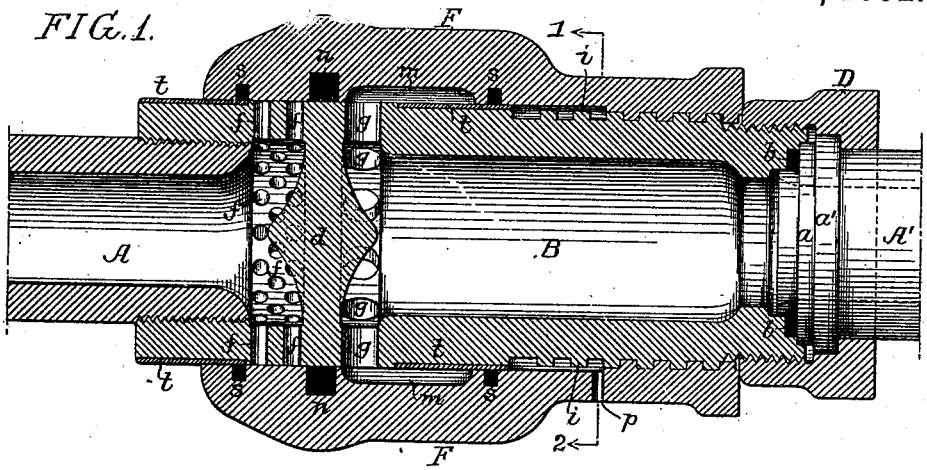
Figure 2:
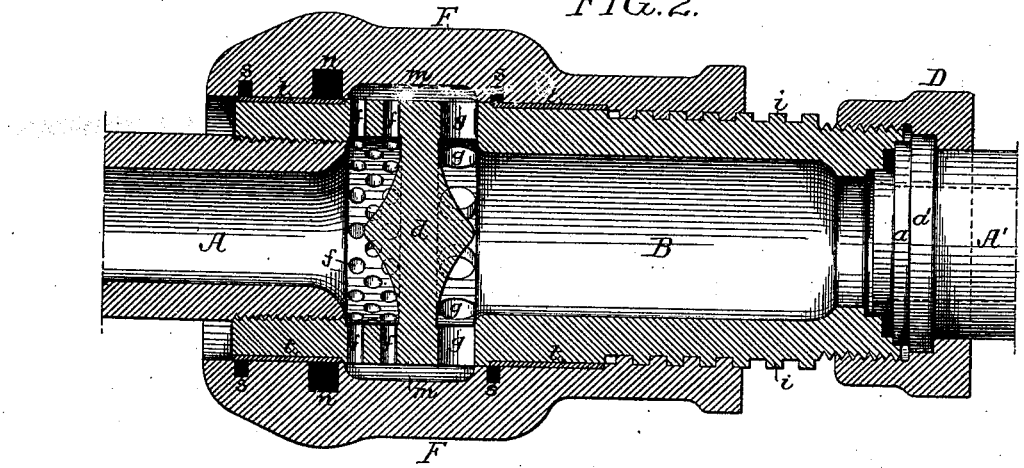
Figure 3:
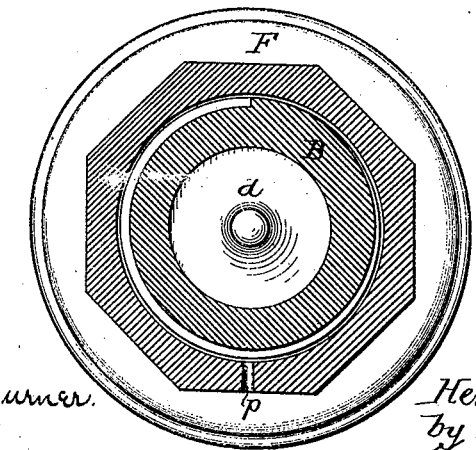

Figure 1 is a longitudinal section, partly in elevation, of a stop-valve constructed in accordance with my invention, showing parts of the pipes in connection with which the valve is used and showing the valve in the closed position. Fig. 2 is a similar view showing the valve open, and Fig. 3 is a transverse section on the line 1 2, Fig. 1.

In Figs. 1 and 2, A A' represent parts of a pipe or tube, through which water or other fluid under heavy pressure is intended to be conveyed. The portion A of the pipe is tightly screwed into one end of a tube B, and against the other end of this tube is seated a flange or collar $a$ upon the portion A' of the pipe, suitable packing $b$ insuring a tight joint, and the flange $a$ being pressed to its seat by the action of a nut D upon a flange $a'$ of the pipe. While this construction is preferred, however, it is not absolutely necessary, as the pipe A' might be screwed into the tube B in the same manner as the pipe A, or said tube might even in some cases be integral with one of the pipe-sections, the tube in any event forming simply a section of the conveyer-pipe and providing a seat for the valve referred to hereinafter.

The tube B has a partition $d$, and in said tube on opposite sides of this partition are formed a series of ports $f$ and $g$, the inlet-ports $f$ being preferably of less diameter than the outlet-ports $g$ and being staggered or alternated so that the periphery of that portion of the tube B in which the ports are formed will still afford a good bearing for any surface sliding over the tube.

On the tube B is formed an external screw-thread $i$, and to this thread is adapted an internal screw-thread formed in the sliding valve F, the latter being in the form of a sleeve, which fits snugly to that part of the tube B beyond the threaded portion of the same.

In the sliding valve F is an annular chamber $m$ of sufficient length to bridge the two sets of ports $f$ and $g$, formed in the tube B, so that when the valve is turned on the tube B and is thereby projected so as to cause its chamber $m$ to bridge said ports, the water will flow through the set of ports $f$, through the chamber $m$, around the partition $d$, and into the other set of ports $g$; but when the valve F is retracted so that the chamber $m$ fails to cover the ports $f$, flow through the tube B will be cut off. The valve carries a packing-ring $n$ for preventing leakage from one set of ports to the other under the latter circumstances, and said valve is also by preference provided with packing-rings $s$ to prevent leakage at the outer end of the valve or into the spaces between the threads of the tube. In case of any slight leakage into the latter spaces, however, the fluid is permitted to escape through a drainage-opening $p$. The packing-rings $s$ preferably bear upon rings $t$, of brass or bronze, let into the tube B, so as to prevent rusting or sticking of the valve, which might be caused by contact of two iron or steel surfaces. The partition $d$ is preferably cone-shaped on opposite sides, so as to direct the water laterally to and through the ports and prevent the ramming action of the water upon a flat plate as well as to stiffen and strengthen the partition at and near the center of the same.

That portion of the valve F which is threaded interiorly is of octagon or other polygonal form exteriorly for the reception of a suitable instrument, whereby the valve may be turned and the sliding movement of the valve can be readily effected, owing to the fact that said sliding movement is combined with the turning movement and the friction between the valve and the tube B can thus be much more readily overcome than if the valve had a sliding movement or a turning movement only on the tube. My invention is not necessarily limited to this method of operation, however, as the valve might in some cases have a simple sliding movement.

Having thus described my invention, I claim and desire to secure by Letters Patent—

1. The combination of the tube forming a section of a fluid-conveying pipe or conduit and having a partition, inlet-ports on one side of said partition, and outlet ports on the opposite side of the same with a valve movable on said tube and consisting of a single sleeve having a chamber for bridging the ports thereof, and three packings each consisting of a ring adapted to an internal annular groove in the valve, said packings being so located in respect to the ports that when the valve is open there will be packing-rings between the ends of the valve and the ports and when the valve is closed there will be a packing-ring between the ports as well as rings between said ports and the ends of the valve, the inlet-ports in this case being closed by a blank portion of the valve-body which fits snugly upon the outer face of the ported tube, substantially as specified.

2. The combination of the tube forming a section of a pipe or conduit and having an external thread, an internal partition, and ports on opposite sides of said partition with a valve surrounding said tube and having an internal chamber for bridging the ports and an internal thread for adaptation to the external thread on the tube, whereby a combined turning and sliding movement of the valve is caused in opening or closing the same, substantially as specified.

3. The combination of the tube forming part of a pipe or conduit and having an internal partition coned at the center and ports on opposite sides of said partition with the sliding valve having a chamber bridging said ports, substantially as specified.

In testimony whereof I have signed my name to this specification in the presence of two subscribing witnesses.

HENRY W. LOSS.

Witnesses:
 EUGENE ELTERICH,
 HARRY SMITH.